United States Patent [19]

Diesel et al.

[11] Patent Number: 5,505,410
[45] Date of Patent: Apr. 9, 1996

[54] INSTRUMENT CALIBRATION METHOD INCLUDING COMPENSATION OF CENTRIPETAL ACCELERATION EFFECT

[75] Inventors: John W. Diesel, Woodland Hills; Gregory P. Dunn, Northridge, both of Calif.

[73] Assignee: Litton Systems, Inc., Woodland Hills, Calif.

[21] Appl. No.: 247,313

[22] Filed: May 23, 1994

[51] Int. Cl.$^6$ .............................. G06G 7/78; G05D 1/00; B64C 17/06
[52] U.S. Cl. ................. 244/195; 244/76 R; 244/175; 244/79; 364/447; 364/453
[58] Field of Search ............................ 244/75 R, 76 R, 244/76 B, 175, 194, 195, 79; 364/447, 453

[56] References Cited

U.S. PATENT DOCUMENTS

| | | | |
|---|---|---|---|
| 3,788,579 | 1/1974 | Sliney. | |
| 3,872,284 | 3/1975 | Seligman et al. | 364/453 |
| 4,052,654 | 10/1977 | Kramer et al. | 244/79 |
| 4,106,094 | 8/1978 | Land | 244/175 |
| 4,167,735 | 9/1979 | Lewis | 364/447 |
| 4,194,244 | 3/1980 | Lewis | 364/428 |
| 4,254,465 | 3/1981 | Land | 364/453 |
| 4,261,537 | 4/1981 | Tisdale, Sr. et al. | 244/195 |
| 4,303,978 | 12/1981 | Shaw et al. | 244/177 |
| 4,482,961 | 11/1984 | Kilner et al. | 364/428 |
| 4,608,641 | 8/1986 | Snell | 364/453 |
| 4,674,710 | 6/1987 | Rodriguez | 244/76 R |
| 4,800,501 | 1/1989 | Kinsky | 364/453 |
| 5,008,825 | 4/1991 | Nadkarni et al. | 244/178 |
| 5,203,220 | 4/1993 | Lerman | 364/453 |

FOREIGN PATENT DOCUMENTS 617259  9/1994  European Pat. Off. ............... 364/453

OTHER PUBLICATIONS

Publication: John W. Diesel, "Calibration of a Ring Laser Gyro Inertial Navigation System For Minimum Velocity Error," *Fourteen Biennial Guidance Test Symposium*, Central inertial Guidance Test Facility Guidance Test Division, 6585th Test Group, Holloman AFB, vol. II (Oct. 3–5, 1989), pp. 1—1 through 1-20.

*Primary Examiner*—Andres Kashnikow
*Assistant Examiner*—Virna Lissi Mojica
*Attorney, Agent, or Firm*—Elliott N. Kramsky

[57] ABSTRACT

A method and apparatus are provided for addressing the effect of centripetal acceleration upon estimates of cross-track velocity, for determination of east gyro bias error, generated with a taxiing aircraft. After initial estimates of crab angle, ratio of crab angle to centripetal acceleration and lever arm are provided, velocity, heading angle and heading angle rate are observed as the aircraft taxis. An estimated value of centripetal acceleration is taken as the product of heading angle rate and heading velocity. Cross-track velocity is computed from cross-heading velocity and this is integrated to generate cross-track position. A Kalman filter generates various gains, including one associated with the ratio of crab angle to centripetal acceleration, for error allocation. The product of the Kalman gain pertaining to crab angle ratio and the computed cross-track position provides a crab angle ratio error that is integrated and multiplied by the estimated centripetal acceleration to provide an optimum estimate of the portion of crab angle that is associated with centripetal acceleration.

19 Claims, 4 Drawing Sheets

INSTRUMENT CALIBRATION METHOD INCLUDING COMPENSATION OF CENTRIPETAL ACCELERATION EFFECT

BACKGROUND

1. Field of the Invention

The present invention relates to a method for calibrating an aircraft's strapdown inertial navigation system based upon data collected during the taxiing mode. More particularly, this invention pertains to an improved method for determining cross-track velocity, and thus east gyro bias error, by taking account of the effect of centripetal acceleration upon error sources.

2. Description of the Prior Art

Aircraft inertial navigation relies upon the integration of data throughout a sequence that is begun when the aircraft is prepared for takeoff and which ends when the aircraft has landed and motion has ceased. The inertial navigation apparatus of an aircraft includes various components, including accelerometers and gyroscopes, that convert the effects of inertial forces into acceleration, velocity and position measurements. The accelerometers determine acceleration forces along three orthogonal sensitive axes and this data is converted, through integrations, into the aircraft's velocity and position. In a strapdown system in which the accelerometers are fixed in relation to the geometry of the aircraft, the gyroscopes that measure the aircraft's attitude also measure that of the accelerometer platforms. The data measured by the gyros is utilized to resolve the accelerometer outputs continuously along the appropriate space axes.

The standard inertial instruments are well-suited for obtaining the necessary flight data in an airborne vehicle. However, important calibration processes take place at the beginning of the flight and prior to the airborne phase to assure that the ultimate measurements of acceleration, velocity and position are substantially free of inaccuracy and bias. Thus, during initial alignment, the precise location and the attitudes of the inertial navigation instruments must be determined and entered into the flight computer, a process that corresponds to the "leveling of the reference platform" that takes place in a non-strapdown or gimballed navigation system.

After initial instrument alignment, the flight computer enters the navigation mode and remains in this mode for the remainder of the flight. While in the navigation mode, the flight computer receives information from the accelerometers and keeps track of the attitudes of the inertial instruments by means of the gyros. Such attitude information is received from the integration of the rate signals received from the gyroscopes.

The initial alignment mode also serves as an opportunity to correct instrument errors. An important error of this sort is the body component of gyro bias error. This error refers to the fixed offset or bias of the angular rate output of the gyros along the aircraft's pitch and roll axes. Unfortunately, in the prior art it has only been possible to partially correct this error.

Conventionally, this problem is addressed by resolving the gyro rates about the pitch and roll axes to a north and east system. A process known as "mini biasing" is then employed during alignment (and prior to taxiing) to correct the gyro components along the northern axis. Unfortunately, the error components along the east axis ("original east gyro bias error") are unobservable during initial alignment. Such non-observability follows from the fact that the initial azimuth determination (i.e. gyrocompassing) utilizes the east component of the gyro outputs to determine azimuth since it is known that the east component of the Earth's angular rate should be zero. Thus, these components are assumed to be correct. That is, the direction of the Earth's rotation rate is employed to determine the initial azimuth of the instrument platform.

Figure 1A:
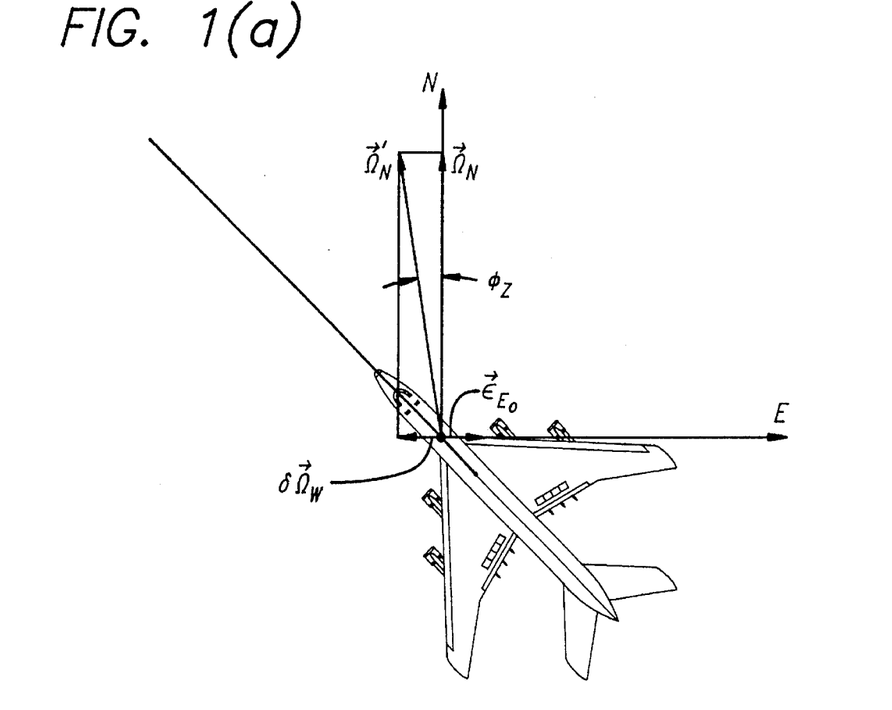
FIGS. 1(a) and 1(b) are top plan views of an aircraft during the alignment mode and the taxiing portion of the navigation mode, respectively, for use in illustrating the observability of the east component of gyro bias error.
Figure 1B:
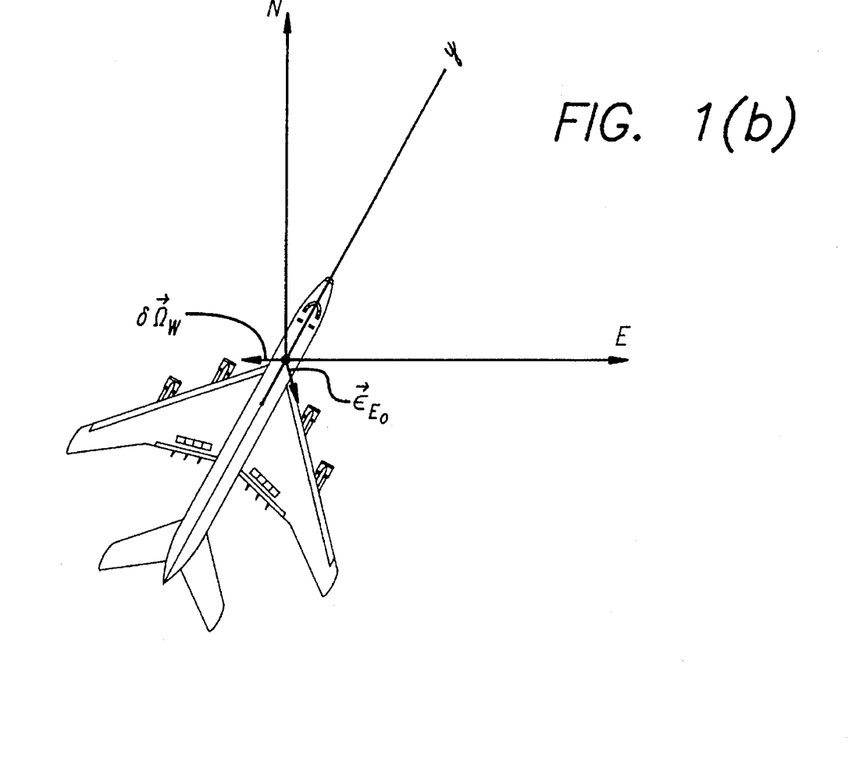

FIGS. 1(a) and 1(b) are top plan views of an aircraft during the alignment mode and the taxiing portion of the navigation mode respectively. As shown in FIG. 1(a), at the end of alignment the east component of gyro bias error $\epsilon_{E_o}$ is balanced by the west component of the Earth's angular rate error $\delta\Omega_w$ $(=\phi_z \times \Omega_N$ where $\Omega_N$ is the north component of the earth's angular rotation rate) resulting from a residual azimuth error $\phi_z$. For this reason, velocity errors are not observed until the aircraft changes heading during the taxiing portion of the navigation phase. As shown in FIG. 1(b), when a change of heading occurs, the original east gyro bias error $\epsilon_{E_o}$ rotates with the taxiing aircraft and no longer lies in the east coordinate direction. The west component of the Earth's angular rate error, $\delta\Omega_w$, continues to lie in the west coordinate direction as it is determined by the navigation reference axes rather than by the aircraft body axes.

The absence of a method for determining or, needless to say, correcting the east axis component of gyro error $\epsilon_{E_o}$ can lead to significant difficulties during flight as this error will cause position errors to accumulate through integration. A method for addressing the inherent inability to observe the east component of gyro bias error during the alignment phase is described in a paper of John W. Diesel, "Calibration of a Ring Laser Gyro Inertial Navigation System For Minimum Velocity Error", *Fourteenth Biennial Guidance Test Symposium*, Central Inertial Guidance Test Facility, Guidance Test Division, 6585th Test Group, Holloman AFB, Vol. II (Oct. 3, 4, 5, 1989) at pages 1—1 through 1-20. That paper describes a system for inferring the original east component of gyro error, $\epsilon_{E_o}$, through observations made during the post-alignment taxiing portion (i.e. as shown in FIG. 1(b)) of the navigation phase. The method operates upon the relationship between the cross-heading velocity of a taxiing aircraft and the original east component of gyro bias error.

As mentioned earlier, once an aircraft begins taxiing and changes heading, the east component of gyro bias error and the west component of the Earth rotation rate error are no longer balanced, as the original east component of gyro bias error rotates with the body of the aircraft while the west component of the Earth rotation rate error remains aligned with the computed reference system. As a consequence, a net angular rate error begins to build up, resulting in a rate of change or tilting of the computed reference axis system or platform. The tilting of the computed platform generates acceleration error components due to the force of gravity. As the acceleration errors appear, velocity errors develop through integration. Mathematically, the presence of a net angular rate error, once the heading of the aircraft changes, produces a tilt rate of the computed platform. Integration of the tilt rate causes acceleration error components. Further integration of the acceleration error components generates velocity errors, including a cross-track velocity error. Although the north and east velocity errors cannot be observed directly, the cross-track component of velocity error, $V_{CT}$, can be observed, and its relationship to the north and east velocity errors is known.

The method described in the above-identified paper relies upon the fact that the velocity in the cross-track direction should be zero as the cross-track direction is, by definition, perpendicular to the true velocity vector. The presence of the north and east velocity errors, however, normally results in a finite value of $V_{CT}$. Further, a number of error sources combine to corrupt the value of $V_{CT}$.

Pending U.S. patent application Ser. No. 08/039,725 of John W. Diesel entitled "Method for Calibrating Inertial Navigation Instruments of Aircraft" discusses a method for measuring $V_{CT}$ that addresses the peculiarly difficult problems presented by one of such error sources, the essentially transient and random $\delta V_n$, the error due to lateral and rotational motions of the aircraft while taxiing. Such velocity transients can result from bumps in the runway that affect the landing gear suspension system that can cause the aircraft to roll and to translate both right and left. The resultant sharp velocity spikes are often sufficiently large relative to the cross-heading velocity to overwhelm the error due to the initial east direction gyro bias error.

The pending patent application, property of the Assignee herein, addresses the problems posed by velocity spikes in a method that is based upon recognition of the boundedness of this error source and $V_{CT}$. While $\delta V_n$ can acquire a relatively large value over those brief periods of time as the aircraft "recovers" from transient shocks, its integral is inherently bounded as a taxiing aircraft can be shaken back and forth only so much without breaking the landing gear. It follows from this that the integral of $V_{CT}$, the cross-track position error $P_{CT}$, is also bounded.

The method disclosed in the pending application does not attempt to estimate the value of the disturbances $\delta V_n$. Rather, the impact of that error source upon the optimum estimate of $V_{CT}$ is evaluated through Kalman filtering. The optimum estimates of $V_{CT}$ are integrated to produce the cross-track position error $P_{CT}$ during this process. Kalman gains are computed during this process based, in part, upon the system error model, and are employed to generate optimum estimates of the other parameters that contribute to $V_{CT}$.

The value of the above method for determining east gyro bias error is directly dependent upon the quality or accuracy of the estimate of $V_{CT}$. This, of course, is impacted by the quality of the error model employed. Insofar as the error model of a system fails to accurately represent the propagation of errors within a system, all error sources will be affected. This, of course, will impact the quality or variance associated with the calculated quantity $V_{CT}$, thus directly impacting the east gyro bias error.

SUMMARY AND OBJECTS OF THE INVENTION

It is therefore an object of the present invention to provide a method for reducing the uncertainty associated with crab angle measurement errors in a calibration method in accordance with that disclosed in pending U.S. patent application Ser. No. 08/039,725.

It is another object of the present invention to provide a method to increase the accuracy of error source allocation associated with the measurement of cross-track velocity in a calibration method in accordance with that disclosed in pending U.S. patent application Ser. No. 08/039,725.

It is yet another object of the present invention to achieve the above objects by providing a method that includes a correction for the effect of centripetal acceleration upon estimated crab angle error.

The present invention addresses the preceding objects by providing, in a first aspect, a method for determining the east gyro bias error of the inertial system of an aircraft. Such method is begun by providing initial estimates of crab angle, ratio of crab angle to centripetal acceleration and lever arm. The aircraft is then taxied. The aircraft's velocity with respect to an inertial axis system is observed as is its heading angle and heading angle rate of change. The aircraft's velocity is converted to heading and cross-heading velocity components in an aircraft body axis system. Centripetal acceleration is computed and cross-track velocity then determined.

The cross-track velocity is integrated to determine cross-track position and Kalman gains are generated for the values of crab angle, crab angle-to-centripetal acceleration ratio, lever arm, and aircraft velocity with respect to the inertial axis system. The cross-track position is successively multiplied by the aforementioned Kalman gains to determine respective error values. Such error values are then combined with velocity relative to the aircraft body axis system throughout the taxiing period whereby successive optimum estimates of cross-track velocity are generated. East gyro bias error is then determined from the optimum estimates of cross-track velocity.

In a second method aspect, the present invention provides a method for estimating the cross-track velocity of an aircraft as it taxis that incorporates the above steps without conversion of cross-track velocity to east gyro bias error.

A third method aspect of the invention is directed to estimating the crab angle of a taxiing aircraft having a heading velocity component and a cross-heading velocity component. Such method is begun by apportioning the crab angle into a first component and a second component where the first component is a function of centripetal acceleration. Thereafter, updated optimum estimates of the first and second components are provided.

In a first apparatus aspect, the invention provides an apparatus for determining the east gyro bias error of an aircraft inertial system. Such apparatus includes means for generating initial estimates of crab angle, ratio of crab angle to centripetal acceleration and lever arm. Means are provided for measuring the taxiing velocity of the aircraft with respect to an inertial axis system. Means are additionally provided for measuring the heading angle, and rate of change thereof, of the taxiing aircraft and for converting taxiing velocity to a heading velocity component and a cross-heading velocity component in an aircraft body axis reference system.

Means are provided for computing centripetal acceleration. An integrator is provided for generating a cross-track position error from the cross-track velocity. A statistical filter, responsive to an error model, is provided for generating Kalman gains with respect to crab angle, ratio of crab angle to centripetal acceleration, lever arm and aircraft taxi velocity with respect to the inertial reference axes. A multiplier generates error values by multiplying the cross-track position error by the Kalman gains.

Means are provided for generating optimum estimates of cross-track velocity by combining the error values with taxi velocity taken with respect to the body axis system. Finally, means are provided for generating east gyro bias error from the optimum estimates of cross-track velocity error.

In a second apparatus aspect, the invention provides on-board apparatus for determining the cross-track velocity of a taxiing aircraft that incorporates many of the aforesaid limitations.

The preceding and other features and advantages of this invention will become further apparent from the detailed description that follows. Such description is accompanied by a set of drawing figures. Numerals of the drawing figures, corresponding to those of the written description, point to the features of the invention with like numerals referring to like features throughout both the written description and drawings.

DETAILED DESCRIPTION OF THE PREFERRED EMBODIMENT

Figure 2:
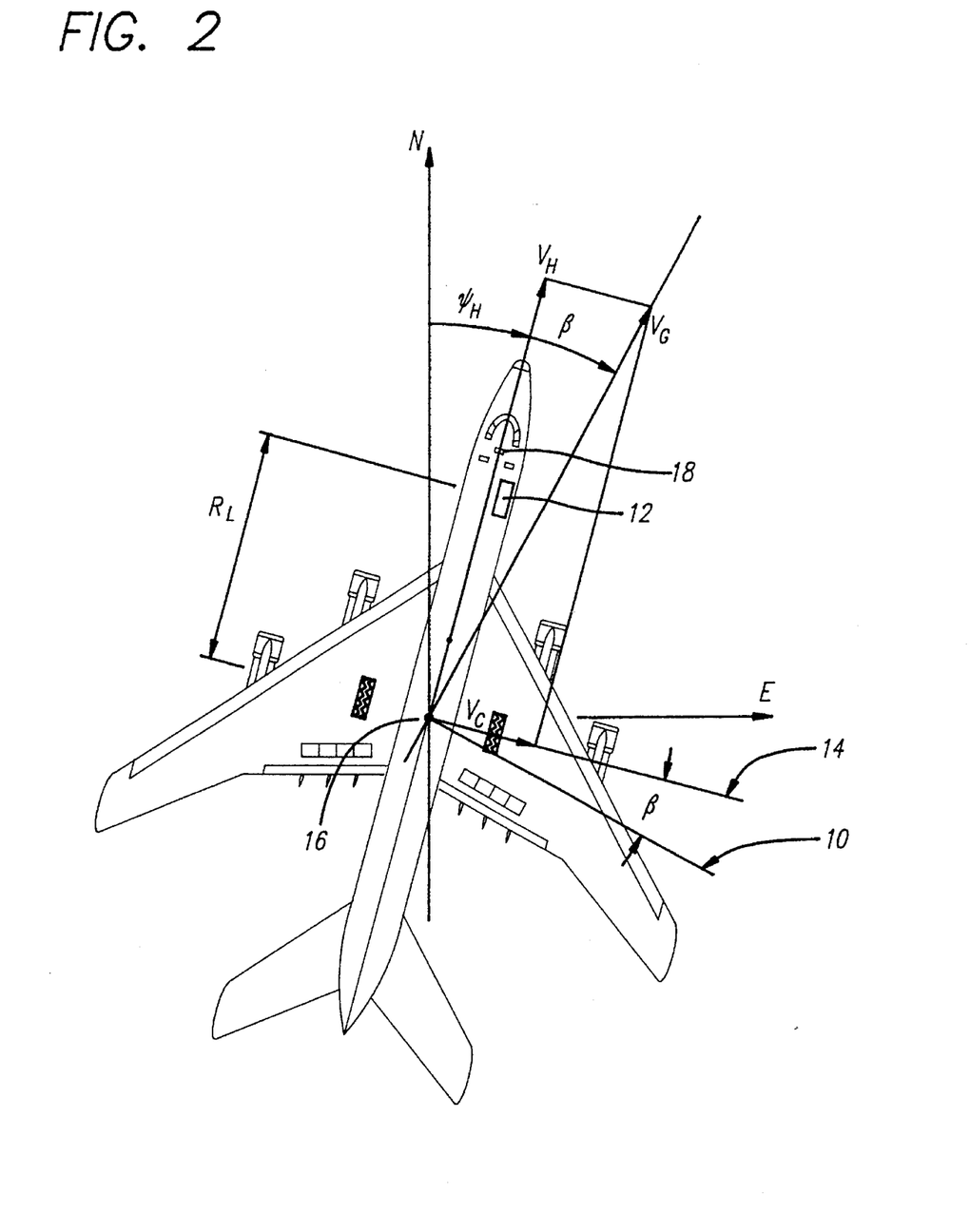
FIG. 2 is a top plan view of an aircraft for use in illustrating the process of inertial instrument calibration in which cross-track velocity is measured and utilized to correct for the east component of gyro bias error.

FIG. 2 is a top plan view of an aircraft while taxiing that identifies certain significant parameters relevant to an inertial instrument calibration process of the type described in the above-identified article of Diesel. As already mentioned, the cross-track velocity error $\vec{V}_{CT}$ is utilized in such process as a surrogate for the critical north and east velocity errors.

The cross-track direction is indicated by an axis 10. As mentioned earlier, the velocity of the taxiing aircraft along the axis 10 should be zero since the cross-track direction is, by definition, perpendicular to the direction of the true velocity vector $\vec{V}_G$. Pending U.S. patent application Ser. No. 08/039,725 teaches a method for analyzing the system errors that contribute to a non-zero measured value of $\vec{V}_{CT}$.

An aircraft inertial measurement device 12, cannot determine the precise cross-track direction. However, while taxiing, the (known) cross-heading direction (indicated by an axis 14) will differ from the cross-track direction of the axis 10 by only a small crab angle β as shown. As taught by the above-identified paper of Diesel, the observed cross-heading velocity $\vec{V}_C$ along the axis 14 is corrected by using crab angle β to thereby obtain an estimated cross-track velocity $\vec{V}_{CT}$. An additional correction is made in regard to the lever arm $R_L$ that measures the distance between the aircraft's center of rotation 16 and the inertial measurement device 12. The cross-track velocity error $V_{CT}$, once determined, is then converted to a value of the initial east component of gyro bias error by means of relationships that are well known in the navigation art. The necessary parameter determinations may be made through calculations performed on the aircraft with the flight or navigation computer, indicated symbolically at 18.

The previously referenced and discussed patent application provides a method for generating an optimum estimate of cross-track velocity, $\hat{V}_{CT}$, in light and in recognition of the error sources associated with its component elements. By utilizing Kalman filtering, the measured error (in the form of a non-zero value of $\vec{V}_{CT}$) is allocated among such error sources and $\hat{V}_{CT}$ continually, iteratively updated as the aircraft taxis. Some of the identified error sources result from the configuration of the aircraft while others reflect the condition of the runway surface and the surrounding physical environment.

Three major error sources pertaining to the estimation of cross-track velocity are recognized and explicitly addressed by the method described in the pending patent application. The first of these, the crab angle error β, a measure of misalignment of the aircraft body with the ground track direction, is most readily adjusted or estimated (i.e. the Kalman filter is provided with the greatest quantity of information) through observation of the cross-heading velocity $\vec{V}_C$ while the taxiing speed is large. β reflects the fact that the wheels of an aircraft are not always pointed straight ahead while taxiing. As described in the pending application, the value of β has been recognized to depend upon such factors as turning of the aircraft on the runaway, misalignment of the landing gear, unequal tire pressures and/or the wind's force transverse to the aircraft's tail.

Error associated with the value of the lever arm measurement $R_L$ that defines the distance between the center of rotation 16 of the aircraft and the inertial measurement device 12 (generally located forward of the main landing gear) produces an additional cross-heading velocity bias that contaminates the optimum estimate of $\hat{V}_{CT}$. The lever arm is best updated in a Kalman filter by measurements of the cross-heading velocity $\vec{V}_{CT}$ taken during periods when the turning rate of the aircraft is large.

A third error source involved in determination of $V_{CT}$ is that due to lateral and rotational velocity spikes, $\delta V_n$. This error source is specifically addressed in the above-mentioned pending United States patent application. The value of $V_{CT}$ is computed in a control loop from on-board measurements and certain initial estimates of the taxiing aircraft. The boundedness of $\delta V_n$ assures that integration of $V_{CT}$ will produce a value of $P_{CT}$ that is bounded. The cross-track position error is then multiplied by a set of updated Kalman gain values based upon the system error model and upon measurements made while taxiing. The products allocate the error in $V_{CT}$ among crab angle β, lever arm $R_L$ and other system error sources, not including $\delta V_n$. Rather, the physical nature of $\delta V_n$ provides assurance that the effect of this random error source will be minimized via the integration of $V_{CT}$ to produce the cross-track position error $P_{CT}$. Due to the interrelatedness of the error sources in terms of error allocation pursuant to Kalman filtering, the mischaracterization of a source will affect the updated Kalman estimates of each. Since the continuous updating of the optimum estimate of $V_{CT}$ depends upon such variables, the reliability of the estimate of cross-track velocity and of east gyro bias error will be affected.

Figure 3:
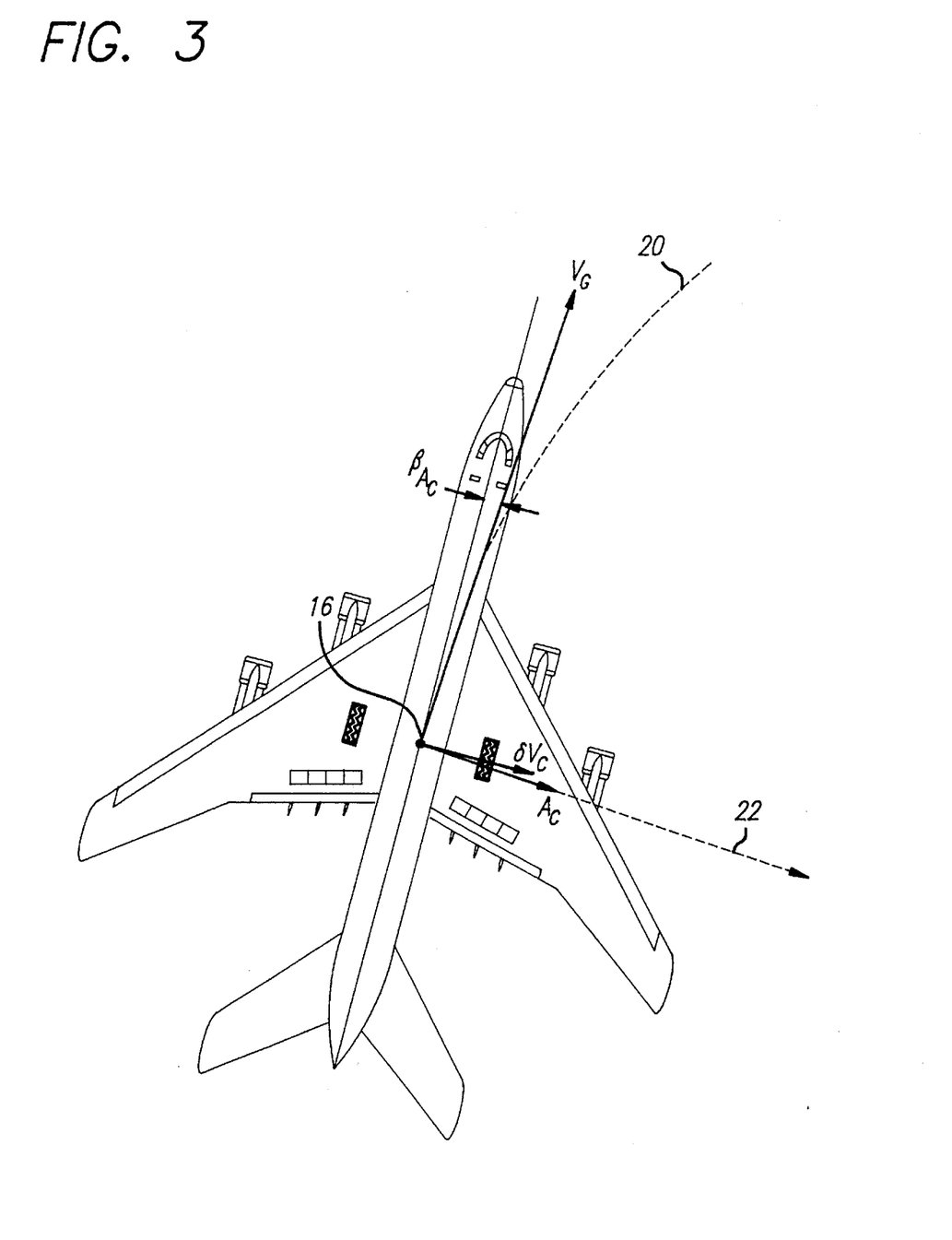
FIG. 3 is a top plan view of an aircraft in accordance with the previous figure with parameters relating crab angle to centripetal acceleration force indicated thereon.

FIG. 3 is a top plan view of the aircraft of the preceding figure for illustrating the effects of a previously-unrecognized factor, centripetal acceleration, $A_C$, that affects the determination of $V_{CT}$. In the prior art it was assumed that the behavior of β is sufficiently described by factors relating to alignment such as the direction of the landing gear relative to the aircraft body, misalignment of landing gear itself, inequality of tire pressures and transverse wind forces. The crab angle was treated accordingly as a sum of a fixed bias component and a correlated noise component just like the estimated lever arm $R_L$.

The inventors have found that prior art modeling of the above-described method for determining initial east gyro bias error has failed to take into account the effect of centripetal acceleration, $A_c$, upon the estimate of crab angle $\beta$. As a result, the modeling of the contribution of $\beta$ to the optimum estimate of $V_{CT}$ is subject to misallocation among possible error sources. The Kalman error model, by overlooking the effect of centripetal acceleration upon crab angle, will continue to reflect such misassignment of error in its estimates due to its inherently iterative nature. In a model such as that described in the above-identified pending application, the misallocation of some error results in an estimate of $V_{CT}$ that is somewhat sub-optimal.

Referring back to FIG. 3, the centripetal acceleration $A_c$ represents a force that acts at the center of rotation 16 of an aircraft turning along a curved path 20 while taxiing along a runway. The centripetal acceleration is directed inwardly along an axis 22 that intersects the center of curvature of the path 20 and produces a force that balances the outwardly-acting centrifugal force that tends to maintain the motion of the aircraft along a straight line (tangent to the path 20).

The inventors have found that the previously-overlooked effect of centripetal acceleration upon crab angle $\beta$ is particularly significant in accurately estimating the cross-track velocity $V_{CT}$ at times of high taxiing velocity. This follows from the fact that the centripetal acceleration of an object moving along an arcuate path 20 is equal to $V^2/R$ where $V$ is the velocity component tangent to the arc and $R$ is the radius of curvature of the path. The inventors have determined that there exists a relatively stable ratio, $\delta\beta/\delta A_C$, that describes the effect of centripetal acceleration upon crab angle. As will be shown below, in updating the optimum estimate of $V_{CT}$, the estimate of $\beta$ is multiplied by a velocity term. Accordingly, this component of the crab angle (i.e., the portion responsive to centripetal acceleration) is a cubic function of velocity. The inventors have found that the quality of the optimum estimate of $V_{CT}$, and that of original east gyro bias error, can be significantly improved by taking this relationship into account in analyzing the cross-track velocity and position errors. Such improvement is particularly evident during periods of high taxiing speed while turning due to the cubic weighting effect of velocity.

The above-identified insight into the dependence of $V_{CT}$ upon centripetal acceleration is addressed in the present invention by separating the analysis of the $\beta$ factor into two parts. One part, $\beta_{AC}$, represents the effect of centripetal acceleration upon the crab angle measurement while the other, $\beta'$, incorporates all other factors, both deterministic and random.

Figure 4:
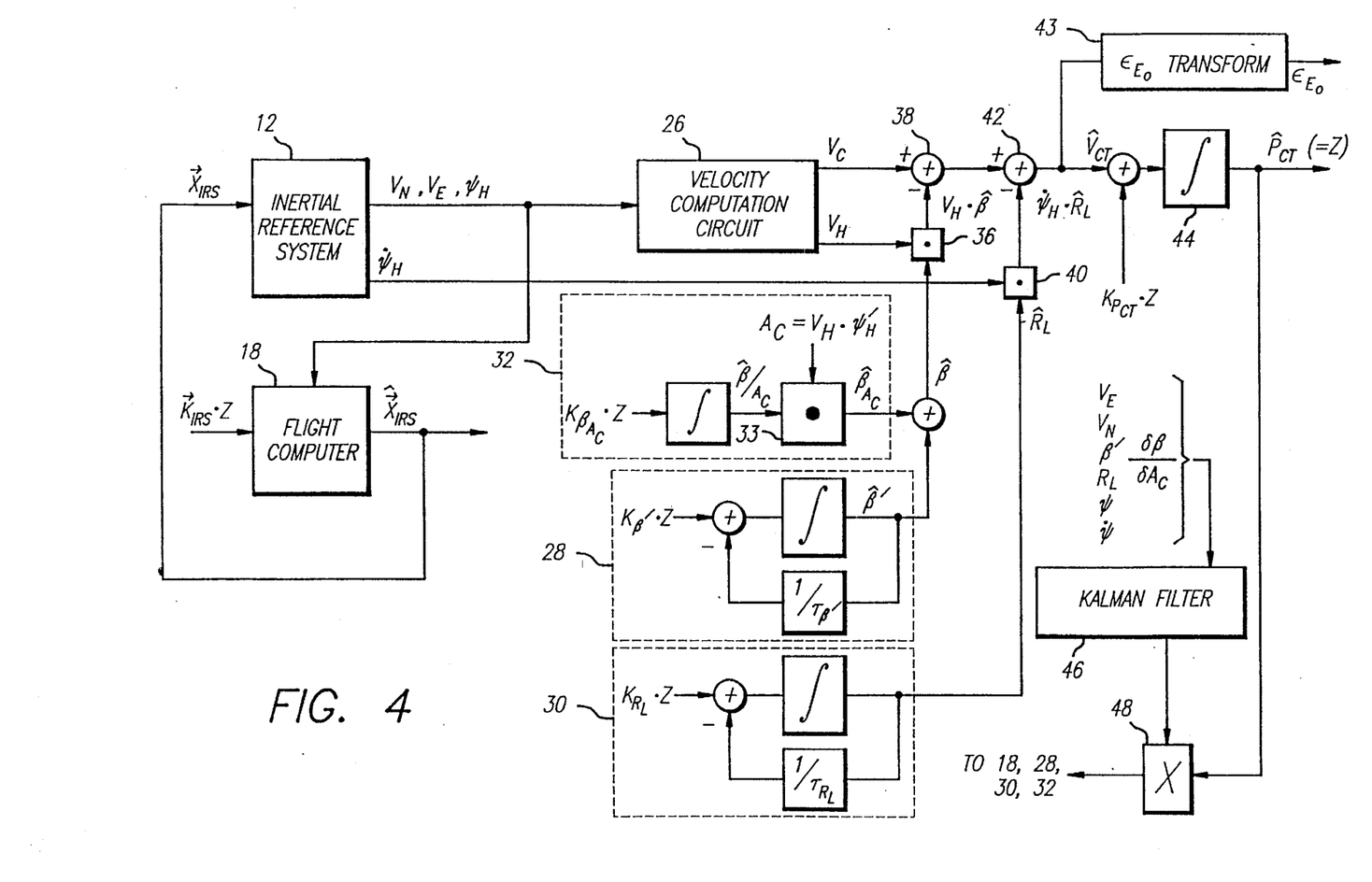
FIG. 4 is a schematic block diagram of the invention for providing an inertial instrument calibration process that incorporates a correction for the effect of centripetal acceleration on estimated crab angle error.

FIG. 4 is a schematic block diagram of the invention. This diagram illustrates an inertial instrument calibration process in accordance with the invention that includes a correction $\beta_{AC}$ for the effect of centripetal acceleration, $A_C$, upon the estimated crab angle $\hat{\beta}$.

It can be shown (refer to FIG. 2) that the cross track velocity of a taxiing aircraft is:

$$V_{CT}=(V_E \cos \psi_H - V_N \sin \psi_H) - V_H \sin \beta - R_L \psi_H \qquad (1)$$

As discussed above, the inventors have found that $\beta$ represents a composite of two terms, one, $\beta_{AC}$, reflecting the rather stable relationship between crab angle and centripetal acceleration ($\delta\beta/\delta_{AC}$) and the other, $\beta'$, representing all other factors. Accordingly $$\beta=\beta_{AC}+\beta' \qquad (2)$$

Where $\beta_{AC}=(\delta\beta/\delta_{AC})\cdot A_C$. Centripetal acceleration may be approximated as follows:

$$A_c=V_H\psi_H \qquad (3)$$

Where $V_H$ is the heading velocity of an aircraft and $\psi_H$ is the rate of change of the heading angle $\psi_H$. Thus, $$\beta_{AC}=(\delta\beta/\delta_{AC}) V_H\psi_H \qquad (4)$$

The error model for determining Kalman gains relevant to $V_{CT}$ is as follows:

$$\delta V_{CT}=(\delta V_E \cos \psi_H - \delta V_N \sin \psi_H) - V_H\delta(\beta_{AC}+\beta') - \psi_H\delta R_L+\delta V_n \qquad (5)$$

Cross-track position $P_{CT}$ (the integral of $V_{CT}$) should theoretically equal zero. In the schematic block diagram of FIG. 4, this quantity is treated as a measure of system error. Various Kalman filter gains, each associated with a modelled error source (including crab angle) are multiplied by this system error term to allocate errors thereamong. The Kalman gain factors are derived in part from the above error model (equation 5) and successive observations taken as the aircraft taxis. The products of the respective Kalman gains with $P_{CT}$ are used to update estimates of terms contributing to the optimum estimate of $V_{CT}$. The calibration of the inertial system requires accuracy in estimating $V_{CT}$ since, as mentioned earlier, its value is employed to determine the original east gyro error.

Returning to FIG. 4, the apparatus of the invention enhances the accurate estimation of the essential variable, $V_{CT}$, by continually updating estimates of relevant factors as the aircraft taxis along the runway and minimizes the effect of the error $\delta V_n$ which is of a random and transient nature. The inertial measurement device 12, comprising a known arrangement of accelerometers and gyros, measures and provides, as relevant outputs, the north and east velocity components, $V_N$ and $V_E$, heading, $\psi_H$, and the rate of change of the estimated aircraft heading $\psi_H$. The three former outputs are then combined by means of a velocity computation circuit 26 to derive the values of cross heading velocity, $V_C$, and velocity along the aircraft heading axis, $V_H$, in accordance with the following relationships:

$$V_C=V_E \cos \psi_H - V_N \sin \psi_H \qquad (6)$$

$$V_H=V_E \sin \psi_H + V_N \cos \psi_H \qquad (7)$$

Optimum estimates of $\beta'$ and $\beta_{AC}$ are provided by filters 28 and 30 respectively while a third filter 32 provides an optimum estimate of the value of the lever arm $R_L$. It may be noted that, while the filters 28 and 32 for providing updated estimates of $\beta'$ and $R_L$ include feedback elements, indicating the processing of a correlated error subject to some noise content. The filter 30, whose output is applied to a multiplier 33, does not include feedback. As mentioned earlier, the value of $\delta\beta/\delta A_C$ has been observed by the inventors to be relatively stable for a taxiing aircraft. Accordingly, the absence of a feedback element within the filter 30 indicates that $\beta_{AC}$ is being treated as a fixed bias error source.

The multiplier 33 receives, as inputs, the output of the filter 30, $\hat{\delta\beta}/\delta A_C$ and $V_H\psi_H$, an approximation of $A_C$. In actuality, the centripetal acceleration $A_C$ is equal to $V_G \cdot \psi_H$. However, due to the small size of $\beta$, this simplification only overlooks a third order effect. The approximation is consistent with the accuracy requirements of the system visa vis the determination of original east gyro bias error.

The estimates of $\beta'$ and $\beta_{AC}$ are then summed at a node 34 and such sum is combined with $V_H$ at a multiplier 36. The resultant product is then subtracted from the cross heading velocity $V_C$ at a difference node 38 in accordance with the error model of equation 5. The estimated lever arm $\hat{R}_L$ is combined with the rate of change of heading $\psi_H$ at a multiplier 40 and the product thereof is then subtracted, along with the output of the difference node 38, at a difference node 42. This is also in accordance with the error model of equation 5. The output of the difference node 42, derived as above, is as follows:

$$V_{CT}=V_C-V_H \sin(\beta_{AC}+\beta')-R_L\psi_H \qquad (8)$$

Where, for small crab angles, $\sin(\beta_{AC}+\beta')$ is approximately equal to $\beta_{AC}+\beta'$. As can be seen, the expression for the output of the difference node 42 is equal to the (computed) aircraft velocity in the cross-track direction $V_{CT}$. This value is applied both to a transform 43 where the necessary operations are performed for deriving a corresponding value of original east gyro bias error, $\epsilon_{E_o}$, and to an integrator 44 whose output is the (derived) cross-track position $P_{CT}$.

Each of the filters 28, 30 and 32 receives, as input, an updated error estimate of the appropriate parameter (i.e. $\delta\beta'$, $\delta\beta_{AC}$ or $\delta R_L$) that has been derived as the product of the cross-track position error $P_{CT}$ and a Kalman gain, $K_i$, based upon initial estimates, observations of the corresponding variables during taxiing, the system error model and the relevant covariances among parameters. The computation of gain factors by Kalman filtering is well known and explained, for example, in Gelb, "Applied Optimal Estimation" (MIT Press 1994).

The gain values $K_i$ are generated within a Kalman filter 46 that receives measurements or observations of $V_E$, $V_N$, $\psi_H$ and $\psi_H$, each determined by the inertial measurement device 12, as well as those of $\beta'$, $\delta\beta/\delta A_C$ and $R_L$ taken as the aircraft taxis. The Kalman gain factors are applied to a multiplier 48 that also receives, as an input, the value of the cross-track position error $P_{CT}$. As outputs, the multiplier 48 provides $\delta V_E$, $\delta V_N$, $\delta\psi_H$, $\delta\psi_H$, $\delta\beta$, $\delta^2\beta/\delta A_C$ and $\beta R_L$, each being the product of the cross-track position error and the corresponding Kalman gain factor $K_i$. The values of $\delta V_E$, $\delta V_N$, $\delta\psi_H$ and $\delta\psi_H$ output from the multiplier 48 are applied to an error calculation means such as the flight computer 18 while the computed values of $\delta\beta$, $\delta^2\beta/\delta A_C$ and $\delta R_L$ are applied to the filters 28 through 32 respectively. The computer 18 performs the necessary calculations for providing a corrective calibration signal to the inertial measurement device 12 internally in accordance with the above described method in which the problems associated with the non-observability of original east gyro error are addressed by measurement of cross-track velocity $V_{CT}$.

Thus it is seen that the invention provides an apparatus and a method for calibrating the inertial navigation system of a taxiing aircraft. The invention is suitable for enhancing the accuracy and utility of a calibration method that relies upon the parameter $V_{CT}$ to determine the original east gyro error. By obtaining an accurate value for this parameter, one may accurately initialize the inertial navigation system of the aircraft as it taxis.

While this invention has been described with reference to its presently preferred embodiment, it is not limited thereto. Rather, this invention is limited only insofar as defined by the following set of patent claims and includes within its scope all equivalents thereof.

What is claimed is:

1. A method for determining the east gyro bias error of the inertial system of an aircraft comprising the steps of:

a) providing initial estimates of crab angle, ratio of crab angle to centripetal acceleration and lever arm; then b) taxiing said aircraft; and c) observing aircraft velocity with respect to an inertial axis system; and d) observing heading angle and rate of change thereof; then e) converting said aircraft velocity to heading and cross-heading velocity components in an aircraft body axis reference system; and f) estimating centripetal acceleration; then g) estimating the cross-track velocity of said taxiing aircraft; then h) integrating said cross track velocity to estimate the cross-track position of said taxiing aircraft; and i) generating Kalman gains for the value of crab angle, ratio of crab angle to centripetal acceleration, lever arm and aircraft velocity with respect to said inertial reference axis; then j) obtaining error values by multiplying said cross-track position by said Kalman gains; then k) generating optimum estimates of cross-track velocity by combining said error values with said cross-heading velocity; and then l) generating east gyro bias error from said optimum estimates of cross-track velocity.

2. A method as defined in claim 1 wherein the step of estimating cross-track velocity further includes the steps of:

a) receiving said cross-heading velocity component; and then b) adjusting said cross-heading velocity component for crab angle and lever arm effects.

3. A method as defined in claim 2 wherein thee step of adjusting said cross-heading velocity component for crab angle further includes the steps of:

a) making an optimum estimate of crab angle; then b) taking the product of said optimum estimate of crab angle and said heading velocity component; and then c) subtracting said product from said cross-heading velocity.

4. A method as defined in claim 3 wherein the step of making an optimum estimate of crab angle further includes the step of adjusting the value of crab angle for centripetal acceleration effects.

5. A method as defined in claim 4 wherein the step of adjusting the value of crab angle for centripetal acceleration effects further includes the steps of:

a) estimating the ratio of crab angle to centripetal acceleration; and b) estimating centripetal acceleration; and then c) multiplying said ratio by said estimated centripetal acceleration.

6. A method as defined in claim 5 wherein the step of estimating centripetal acceleration additionally comprises the steps of:

a) receiving said observed value of heading angle rate of change while taxiing; and b) receiving said heading velocity component; and then c) multiplying said observed value of heading angle rate of change by said heading velocity component.

7. A method as defined in claim 6 wherein the step of estimating said ratio additionally comprises the steps of:

a) receiving said initial estimate of said ratio; then b) making observations of said crab angle as said aircraft taxis; and c) making estimates of centripetal acceleration as said aircraft taxis; and then d) applying the data of steps a through c to a statistical filter to generate an updated Kalman gain for said ratio; and e) deriving a cross-track position of said taxiing aircraft; then f) deriving an updated estimate of ratio error as the product of said Kalman gain and said cross-track position; and then g) integrating said updated error estimate to provide an optimum estimate of said ratio.

8. A method as defined in claim 4 wherein the step of estimating cross-track velocity further includes the steps of:

a) apportioning said crab angle into a first component and a second component, said first component being a function of centripetal acceleration; then b) providing updated optimum estimates of said first and second components; then c) multiplying said first and second components by said heading velocity component; and then d) subtracting said products from said cross-heading velocity.

9. A method as defined in claim 8 wherein the step of providing updated estimates of said first and second crab angle components includes the step of generating a Kalman gain for each of said first and second components.

10. A method for estimating the cross-track velocity of an aircraft as it taxis comprising the steps of:

a) providing initial estimates of crab angle, ratio of crab angle to centripetal acceleration and lever arm; then b) observing aircraft velocity with respect to an inertial axis system; and c) observing heading angle and rate of change thereof; then d) converting said aircraft velocity to heading and cross-heading velocity components in an aircraft body axis reference system; and e) estimating centripetal acceleration; then f) estimating the cross-track velocity of said taxiing aircraft; then g) integrating said cross track velocity to estimate the cross-track position of said taxiing aircraft; and h) generating Kalman gains for the value of crab angle, ratio of crab angle to centripetal acceleration, lever arm and aircraft velocity with respect to said inertial reference axis; then i) obtaining error values by multiplying said cross-track position by said Kalman gains; and then j) generating optimum estimates of cross-track velocity by combining said error values with said cross-heading velocity.

11. A method as defined in claim 10 wherein the step of estimating cross-track velocity further includes the steps of:

a) receiving said cross-heading velocity component; and then b) adjusting said cross-heading velocity component for crab angle and lever arm effects.

12. A method as defined in claim 11 wherein the step of adjusting said cross-heading velocity component for crab angle further includes the steps of:

a) making an optimum estimate of crab angle; then b) taking the product of said optimum estimate of crab angle and said heading velocity component; and then c) subtracting said product from said cross-heading velocity.

13. A method as defined in claim 12 wherein the step of making an optimum estimate of crab angle further includes the step of adjusting the value of crab angle for centripetal acceleration effects.

14. A method as defined in claim 13 wherein the step of adjusting the value of crab angle for centripetal acceleration effects further includes the steps of:

a) estimating the ratio of crab angle to centripetal acceleration; and b) estimating centripetal acceleration; and then c) multiplying said ratio by said estimated centripetal acceleration.

15. A method as defined in claim 14 wherein the step of estimating centripetal acceleration additionally comprises the steps of:

a) receiving said observed value of heading angle rate of change while taxiing; and b) receiving said heading velocity component; and then c) multiplying said observed value of heading angle rate of change by said heading velocity component.

16. A method as defined in claim 15 wherein the step of estimating said ratio additionally comprises the steps of:

a) receiving said initial estimate of said ratio; then b) making observations of said crab angle as said aircraft taxis; and c) making estimates of centripetal acceleration as said aircraft taxis; and then d) applying the data of steps a through c to a statistical filter to generate an updated Kalman gain for said ratio; and e) deriving a cross-track position of said taxiing aircraft; then f) deriving an updated estimate of ratio error as the product of said Kalman gain and said cross-track position; and then g) integrating said updated error estimate to provide an optimum estimate of said ratio.

17. A method as defined in claim 16 wherein the step of estimating cross-track velocity further includes the steps of:

a) apportioning said crab angle into a first component and a second component, said first component being a function of centripetal acceleration; then b) providing updated optimum estimates of said first and second components; then c) multiplying said first and second components by said heading velocity component; and then d) subtracting said products from said cross-heading velocity.

18. Apparatus for determining the east gyro bias error of the inertial system of an aircraft comprising, in combination:

a) means for generating initial estimates of crab angle, ratio of crab angle to centripetal acceleration and lever arm;

b) means for measuring the velocity of said aircraft with respect to an inertial axis system as it taxis;

c) means for measuring heading angle and its rate change while said aircraft taxis;

d) means for converting said taxiing velocity to a heading velocity component and a cross-heading velocity component in an aircraft body axis reference system;

e) means for computing centripetal acceleration;

f) an integrator for generating a cross-track position error from said cross-track velocity;

g) a statistical filter, responsive to an error model, for generating Kalman gains with respect to crab angle, ratio of crab angle to centripetal acceleration, lever arm and aircraft taxi velocity with respect to said inertial reference axes;

h) a multiplier for generating error values by multiplying said cross-track position error by said Kalman gains;

i) means for generating optimum estimates of cross-track velocity by combining said error values with taxiing velocity with respect to said body axis system; and j) means for generating said east gyro bias error from said optimum estimates of cross-track velocity.

19. On-board apparatus for determining the cross-track velocity of a taxiing aircraft comprising, in combination:

a) means for generating initial estimates of crab angle, ratio of crab angle to centripetal acceleration and lever arm;

b) means for measuring the velocity of said aircraft with respect to an inertial axis system as it taxis;

c) means for measuring heading angle and its rate change while said aircraft taxis;

d) means for converting said taxiing velocity to a heading velocity component and a cross-heading velocity component in an aircraft body axis reference system;

e) means for computing centripetal acceleration;

f) an integrator for generating a cross-track position error from said cross-track velocity;

g) a statistical filter, responsive to an error model, for generating Kalman gains with respect to crab angle, ratio of crab angle to centripetal acceleration, lever arm and aircraft taxi velocity with respect to said inertial reference axes;

h) a multiplier for generating error values by multiplying said cross-track position error by said Kalman gains; and i) means for generating optimum estimates of cross-track velocity by combining said error values with taxiing velocity with respect to said body axis system.

* * * * *